(12) United States Patent
Shuman

(10) Patent No.: US 6,914,704 B2
(45) Date of Patent: Jul. 5, 2005

(54) OBLIQUITY CORRECTION SYSTEM

(75) Inventor: Curtis Alan Shuman, Colorado Springs, CO (US)

(73) Assignee: InPhase Technologies, Inc., Longmont, CO (US)

( * ) Notice: Subject to any disclaimer, the term of this patent is extended or adjusted under 35 U.S.C. 154(b) by 115 days.

(21) Appl. No.: 10/211,300

(22) Filed: Aug. 5, 2002

(65) Prior Publication Data

US 2003/0123116 A1 Jul. 3, 2003

Related U.S. Application Data

(60) Provisional application No. 60/343,554, filed on Dec. 21, 2001.

(51) Int. Cl.[7] ............................................... G03H 1/28
(52) U.S. Cl. ........................................ 359/24; 359/662
(58) Field of Search ........................... 359/1, 22, 24, 359/35, 205, 206, 207, 662

(56) References Cited

U.S. PATENT DOCUMENTS

| 3,838,912 A | * | 10/1974 | Arimoto et al. | 359/1 |
| 3,891,976 A | * | 6/1975 | Carlsen | 365/235 |
| 5,543,251 A | * | 8/1996 | Taylor | 430/1 |
| 5,959,747 A | * | 9/1999 | Psaltis et al. | 359/22 |
| 6,023,355 A | * | 2/2000 | Bashaw et al. | 359/21 |

* cited by examiner

Primary Examiner—Mark A. Robinson
Assistant Examiner—Alessandro Amari
(74) Attorney, Agent, or Firm—Morrison & Foerster LLP

(57) ABSTRACT

Disclosed are methods of producing obliquity corrected light beams, and holographic recording and retrieval systems that utilize a obliquity corrected reference beam. The obliquity correction is accomplished using off-center lenses.

25 Claims, 4 Drawing Sheets

OBLIQUITY CORRECTION SYSTEM

FIELD OF THE INVENTION

The present invention relates to optical systems for correcting the variation in the area exposed by a light beam due to the beam's obliquity. More specifically this invention relates to optical systems that decrease the width of a light beam as the obliquity of the light beam increases.

BACKGROUND

Holographic storage systems are storage systems that use holographic storage media to store data. Holographic storage media includes photorefractive materials that can take advantage of the photorefractive effect described by David M. Pepper et al., in "The Photorefractive Effect," Scientific American, October 1990 pages 62–74.

The index of refraction in photorefractive materials can be changed by light that passes through them. Holographic storage media also include photopolymers, such as those described in Coufal et al., "Photopolymers for Digital Holographic Storage" in Holographic Data Storage, 199–207 (2000), and photochromatic materials. By controllably changing the index of refraction in such materials, high-density, high-capacity, and high-speed storage of information in holographic storage media can be accomplished.

In the typical holographic storage system, two coherent light beams are directed onto a storage medium. The first coherent light beam is a data beam, which is used to encode data. The second coherent light beam is a reference light beam. The two coherent light beams intersect within the storage medium to produce an interference pattern. The storage medium records this interference pattern by changing its index of refraction to form an image of the interference pattern.

The recorded information, stored as a holographic image, can be read by illuminating the holographic image with a reference beam. When the holographic image is illuminated with a reference beam at an appropriate angle, a data beam containing the information stored is produced. Most often the appropriate angle for illuminating the holographic image will be the same as the angle of the reference beam used for recording the holographic image.

Information can be encoded within the data beam in a variety of ways. One way of encoding information into a data beam is by using an electronic mask, called a spatial-light modulator (SLM). Typically, a SLM is a two dimensional matrix of pixels. Each pixel in the matrix can be directed to transmit or reflect light, corresponding to a binary 1, or to block light, corresponding to a binary 0. The data beam, once encoded by the SLM, is relayed onto the storage medium, where it intersects with a reference beam to form an interference pattern. The interference pattern records the information encoded in the data beam to the holographic storage medium.

The information recorded in the holographic storage medium is read by illuminating the storage medium with a reference beam. The resulting data beam is then typically imaged onto a sensor, such as a Charge Coupled Device (CCD) array or a CMOS active pixel sensor. The sensor is attached to a decoder, which is capable of decoding the data.

A holographic storage medium includes the material within which a hologram is recorded and from which an image is reconstructed. A holographic storage medium may take a variety of forms. For example, it may comprise a film containing dispersed silver halide particles, photosensitive polymer films ("photopolymers") or a freestanding crystal such as iron-doped LiNbO3 crystal. U.S. Pat. No. 6,103,454, entitled RECORDING MEDIUM AND PROCESS FOR FORMING MEDIUM, generally describes several types of photopolymers suitable for use in holographic storage media. The patent describes an example of creation of a hologram in which a photopolymer is exposed to information carrying light. A monomer polymerizes in regions exposed to the light. Due to the lowering of the monomer concentration caused by the polymerization, monomer from darker unexposed regions of the material diffuses to the exposed regions. The polymerization and resulting concentration gradient creates a refractive index change forming a hologram representing the information carried by the light.

FIG. 1 illustrates the basic components of a holographic system 100. System 100 contains a SLM 112, a holographic storage medium 114, and a sensor 116. SLM 112 encodes beam 120 with an object image. The image is stored by interfering the encoded data beam 120 with a reference beam 122 at a location on or within holographic storage medium 114. The interference creates an interference pattern (or hologram) that is captured within medium 114 as a pattern of, for example, a holographic refractive index grating.

It is possible for more than one holographic image to be stored at a single location, or for a holographic image to be stored at a single location, or for holograms to be stored in overlapping positions, by, for example, varying the angle, the wavelength, or the phase of the reference beam 122, depending on the particular reference beam employed. Data beam 120 typically passes through lenses 130 before being intersected with reference beam 122 in the medium 114. It is possible for reference beam 122 to pass through lenses 132 before this intersection. Once data is stored in medium 114, it is possible to retrieve the data by intersecting a reference beam 122 with medium 114 at the same location and at the same angle, wavelength, or phase at which a reference beam 122 was directed during storage of the data. The reconstructed data beam passes through one or more lenses 134 and is detected by sensor 116. Sensor 116, is for example, a charged coupled device or an active pixel sensor. Sensor 116 typically is attached to a unit that decodes the data.

Varying the angle of the reference beam during recording to store multiple holographic images in the same volume is called angle multiplexing. Each image is recorded in the same volume using a different reference beam angle. A large number of images can be stored in the same volume using angle multiplexing by varying the angle of the reference beam over a wide range.

However, varying the reference beam angle can increase the area of the holographic storage medium exposed by the reference beam. The area exposed by a reference beam that strikes the surface of the holographic storage medium depends upon the reference beam's angle of incidence with the storage medium ("the obliquity"). This area is related to the capacity of the holographic storage medium since the larger area exposed by the reference beam, the smaller the capacity of the holographic storage medium per unit volume. Accordingly, a need exists for a optical system that is capable of maintaining the size of the area exposed by a reference beam as the obliquity of the reference beam changes.

In the past, obliquity has been corrected using a complex set of prisms. The use of these prisms is discussed in Coufal et al., "Tamarack Optical Head Holographic Sorage" in Holographic Data Storage, 343–357 (2000). FIG. 2 shows an obliquity correction system using two prisms 226 and 228 and three lens component 230, 232 and 234. In FIG. 2, light beams 224 are reflected off of scanning mirror 222 onto first prism 226. The light beams exiting first prism 226 then proceed to second prism 228. The light beams exiting second prism 228 then proceed through lens components 230, 232 and 234.

The use of the complex prisms shown in FIG. 2 have the drawback of being difficult to manufacture and align. Accordingly, a need exists for an obliquity correction system that does not require the use of complex prisms.

SUMMARY OF THE INVENTION

Disclosed are methods of producing obliquity corrected light beams, and holographic recording and retrieval systems that utilize a obliquity corrected reference beam.

In one embodiment, the method of producing an obliquity corrected light beam comprises projecting a light beam through one or more off-center lens components onto a surface with an angle of incidence. The off-center lens components vary the width of the light beam as a function of the angle of incidence on the surface.

Preferably, the lens components narrow the width of the light beam as the angle of incidence increases. Preferably, the projected light beam is a planar beam. Preferably, the incident light beam is a collimated beam. Preferably, the off-center lens components image the light beam anamorphically.

Preferably, the off-center lens components produce a wavefront error of less than 20 waves. Preferably, the surface comprises a holographic storage medium with a polymer matrix.

In another embodiment, the holographic recording system comprises a reference beam source, a lens system and a holographic storage medium. The reference beam source projects a reference beam that is incident upon the holographic storage medium and the lens system varies the width of the reference beam as a function of the angle of incidence upon the holographic storage medium.

Preferably, the incident reference beam is projected onto a planar surface of the holographic storage medium. Preferably, the holographic storage medium comprises a polymer matrix. Preferably, the reference beam source comprises a scanning mirror. Preferably, the reference beam intersects a data beam within the holographic storage medium to produce an interference pattern. Preferably, the interference pattern is recorded within the holographic storage medium.

Preferably, the reference beam that is incident upon the holographic storage medium with an angular range of at least 20 degrees to 50 degrees.

In yet another embodiment, the holographic retrieval system comprises a reference beam source, a lens system and a holographic storage medium. The reference beam source projects a reference beam that is incident upon the holographic storage medium and the lens system varies the width of the reference beam as a function of the angle of incidence upon the holographic storage medium. Preferably, the reference beam intersects a holographic image within the holographic storage medium to produce a data beam.

BRIEF DESCRIPTION OF THE DRAWINGS

The invention will be better understood by reference to the Detailed Description of the Invention when taken together with the attached drawings, wherein.

DETAILED DESCRIPTION OF THE INVENTION

Figure 1:
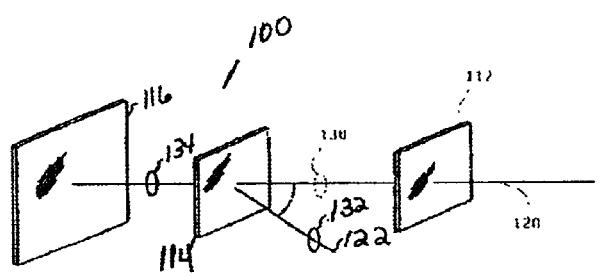
FIG. 1 is a holographic storage and retrieval system.
Figure 2:
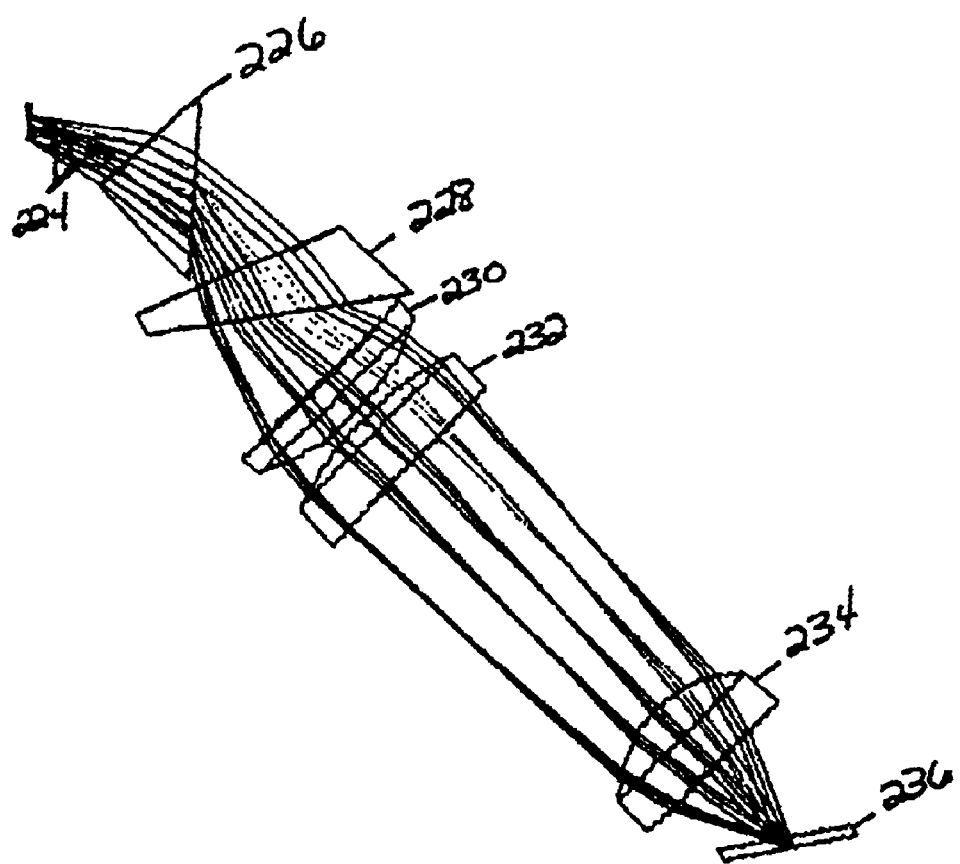
FIG. 2 is a prior art obliquity correction system.

When a beam of light strikes a surface, the area exposed by the beam is dependent upon the incidence angle (the "obliquity") of the beam of light. The greater the obliquity of the beam of light, the greater the surface area exposed by the beam. The area exposed by a beam of light striking a surface is also dependent upon the width of the beam of light. The wider the beam of light, the greater the surface area exposed by the beam. Accordingly, by decreasing the width of a beam of light as the obliquity increases, the surface area exposed by a beam of light can be maintained relatively constant.

Described are optical systems that help minimize the dispersion of a beam of light that is incident upon a surface. Particularly, the optical systems decrease the width of a light beam as the obliquity of the light beam upon a surface increases.

The disclosed optical systems can be used for a variety of applications where a surface is illuminated with a beam of light. A preferred application for the disclosed optical systems is in holographic data storage systems (HDSS).

An HDSS is composed of an optical system that directs and shapes coherent optical beams to intersect at a surface or volume where the interference pattern is recorded. The hologram constitutes the recorded pattern in the media.

In HDSS, an entire page of information is stored at once as an optical interference pattern within a holographic storage medium by intersecting two coherent laser beams within the holographic storage medium. The first beam is called the "data beam," which contains the information to be stored. The second beam is called the "reference beam." The reference beam is often (but not necessarily) an unmodulated beam, preferably a spherical beam or a collimated beam with a planar wave front.

Multiple interference patterns can be stored within the same volume using angle multiplexing. In angle multiplexing, each interference pattern is stored using a specific reference beam angle. Multiple pages of information can be recorded within the same volume of holographic storage medium by changing the reference beam angle for each interference pattern. An angular spacing between reference beam angles is provided to help prevent the interference patterns from overlapping one another.

To store a large number of images within the same volume using angle multiplexing, preferably the angle of the reference beam is varied over a wide range. However, when a reference beam strikes the surface of the holographic storage medium with a large angle of incidence, the reference beam can spread out across the surface of the holographic storage medium exposing unintended regions of the holographic storage medium.

A common trait of typical holographic systems is the overlapping of two coherent beams inside a photosensitive medium. The interference pattern generated by the two beams is recorded in the material in the form of a hologram. The ratio of the intensity of the reference beam and the data beam at any point of overlap in the media controls the localized recording rate of the hologram. If the reference beam intensity varies over the media volume, then the quality of the hologram is degraded as different positions in the media record at different rates.

Preferably, the size of the reference beam is controlled so that when the reference beam spreads out as the angle of incidence increases, the size and intensity of the reference traveling through the optical material after striking the surface remains relatively constant, regardless of the angle of incidence. By narrowing the reference beam as the angle of incidence increases, the size and intensity of the reference beam within the optical material can be made to remain relatively constant.

Controlling the size of the of the reference beam as a function of angle of incidence can also improve the storage capacity of the optical material. When the reference beam spreads out at large angles of incidence, unintended areas of the optical material may be exposed. If these unintended areas of the optical material contain recorded interference patterns, or are used to record interference patterns, these interference patterns may become damaged. If these unintended areas are left empty, the loss of recording space in the optical material may result.

Many kinds of materials could be used as holographic storage media. Photopolymers are very promising because of their high sensitivity and dynamic range. Phenanthrenequinone-doped polymethylmethacrylate (PQ/PMMA) has excellent optical quality and is based on a photoreaction between the dopant and polymer followed by diffusion of unreacted chromophore.

Preferably the HDSS produces a planar reference beam. A "planar beam" is a beam that is characteristic of light emitted from a point source at infinity. In a planar beam, the propagating beam has a wavefront of plane waves propagating in a single direction.

In one embodiment, the reference beam is projected onto a scanning mirror. The scanning mirror can then be used to reflect the reference beam through an optical system which directs the reference beam onto the surface of a holographic storage medium. The optical system contains one or more lenses that "obliquity correct" the reference beam so that the width of the beam varies with the beam's obliquity to the surface of the holographic storage medium.

In an alternative embodiment, the reference beam is directly projected by a light source through the optical system onto a storage medium without the use of a scanning mirror. The optical system again can be used to obliquity correct the reference beam before directing it onto the holographic storage medium.

Whether the reference beam is directly projected through the optical system, or is reflected off of a scanning mirror through the optical system, preferably the reference beam can be projected onto the storage medium using a wide range of incident angles.

Preferably, the angle of the incident reference beam at an off-axis from the normal of a region of the medium is from about 20 degrees to about 50 degrees. More preferably, the angle of the incident reference beam is from about 10 degrees to about 60 degrees. Most preferably, the angle of the incident of the reference beam is from about −10 degrees to 70 degrees.

A preferred optical system for obliquely correcting the reference beam comprises one or more off-center lens elements. An off-center lens element has an optical axis which is not perpendicular to the surface onto which the light passing through the lens is projected, and in which the optical axis does not pass through the point being imaged or illuminated. In a HDSS the surface would be the surface of the holographic storage medium.

The aberrations of the off-center lens elements can be used to control the width of the reference beam as the angle of incidence of the reference beam relative to the holographic storage medium changes. The lenses are preferably designed to image plane waves anamorphically, that is the magnification is different in the two directions. Preferably, the lenses provide a different magnification in the scan direction, and the direction orthogonal to the scan direction.

Preferably, the anamorphic magnification varies over the angular range, by the amount needed to compensate for the obliquity effect. This can be achieved by balancing the aberrations that can affect the beam width) for example, distortion, field curvature, astigmatism, etc., such that they change the width of the beam as a function of the beam angle. Preferably, the lens system is designed to minimize the amount of deterioration in wave front quality. Preferably, the lens system is designed to minimize or prevent any lateral shift of the beam of light passing through the lens system.

Preferably, the change in width of the beam, as it changes incidence angle at the media, is such that the illuminated area remains constant. For thin media, this means that the width of the beam is proportional to the cosine of the incidence angle. A thin storage medium is preferably one that has a thickness less than about 30% of the diameter of the illuminating beam.

For example, if the system includes normal incidence, and if the beam width for normal/perpendicular incidence is defined to be 1 unit, then the following factors could be applied to the beam width as the angle changes for thin media:

| Incidence angle (degrees from normal) | cosine (width change factor) |
| --- | --- |
| 0 | 1.000 |
| 10 | 0.985 |
| 20 | 0.940 |
| 30 | 0.866 |
| 40 | 0.766 |
| 50 | 0.643 |
| 60 | 0.500 |
| 70 | 0.342 |

Accordingly, a beam that is 10 degrees from normal would preferably have a thickness of about 0.985 units.

If the system does not include normal incidence, then the correct change factor at a given angle can be determined as the ratio of the cosines of different beam angles; for example: cosine(given angle)/cosine(smallest angle used). An example is a system that covers 10 to 60 degrees, for the following factors would be applied to the beam width as the angle changes:

| Incidence angle (degrees from normal) | cosine ratio (width change factor) |
| --- | --- |
| 10 | 1.000 |
| 20 | 0.954 |
| 30 | 0.879 |
| 40 | 0.778 |
| 50 | 0.653 |
| 60 | 0.508 |

Preferably, the distortion of the reference beam produced by the optical system is minimized. Distortion can be qualified in terms of peak-to-valley wavefront error measured in wavelengths of the transmitted light. Limiting the distortion of the reference beam passing through the optical system is important for at least two reasons.

First, distortion of the wavefront can decrease the quality of the image produced by the optical system. In a holographic storage system, distortion of the reference beam can decrease the quality of the interference pattern produced by the storage system.

Second, minimizing the distortion of the wavefront is also important for creating a reproducible beam of light. In a HDSS a reproducible reference beam is preferable because a reference beam that is the same or similar to the reference beam used to create the interference pattern is typically used to reproduce the data beam from the interference pattern during the readout process. Accordingly, any distortion of the reference beam due to the optical system should be reproducible. By minimizing the amount of distortion, reproducibility of the reference beam is typically improved.

The wavefront error of the reference beam is preferably less than 20 waves, more preferably less than 10 waves, most preferably less than 0.25 waves. Distortion greater than the diffraction limit of 0.25 waves is still useful in a HDSS because the reference beam errors can be corrected to some extent during the readout process using a reference beam with the same or similar distortion.

Preferably, the optical system does not shift the position of a beam of light passing through the optical system. In a HDSS, a shift in position of the beam of light entering the optical system can cause unintended areas of the holographic storage medium to be illuminated, thereby wasting data storage capacity. To avoid this, the system preferably prevents the beam from shifting position while its width and/or angle is adjusted.

For a thin storage medium the optical system can be designed to constrain the edge rays to limit their lateral motion on the media surface while the beam angle changes. By constraining the edge rays in this manner, a constant area can be illuminated over a range of angles.

For a thick storage medium, maintaining the position of the beam can be more complicated. A thick storage medium is preferably one with a thickness greater than about 30% of the diameter of the illuminating beam. For a thick storage medium it is difficult to prevent the reference beam from illuminating at least some areas of the storage medium where the data beam is not present, so a preferable design criterion is to minimize this area. This can be done by finding the maximum media volume illuminated by the data beam, and then minimizing the size of the reference beam while still completely overlapping the data beam. In practice this is similar to what was done for a thin medium, except that the points where the edge rays are constrained to have no lateral shift occur on opposite sides (i.e., front and back) of the storage medium.

In a preferred embodiment, the constrained points for both a thin and thick storage medium are preferably anywhere from the front surface to the back surface of the media.

Preferably, the reference beam entering the optical system and exiting the optical system is collimated. A collimated light beam is a beam in which the rays are nearly parallel so that the beam does not converge or diverge appreciably. A laser, for example, is a collimated light source.

EXAMPLE 1

Figure 3:
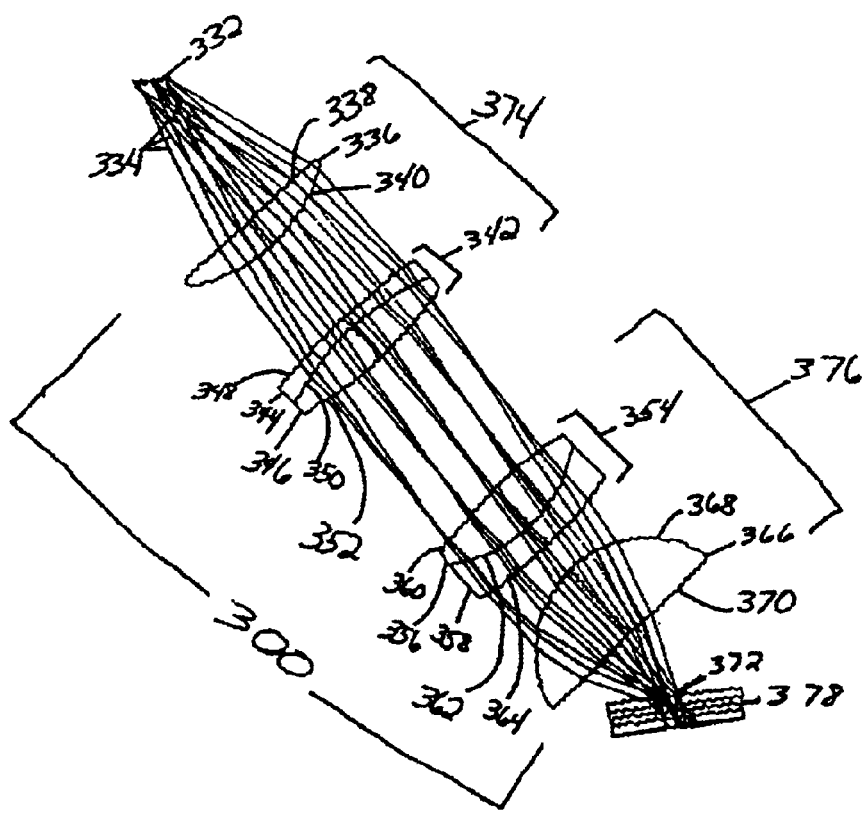
FIG. 3 is one embodiment of an obliquity correction system according to the present invention.

FIG. 3 shows an obliquity correction system 30 made up of four lens components 336, 342, 354 and 366. All four lenses components 336, 342, 354 and 366 have spherical surfaces. A lens component is a single lens element, or two or more lens elements which are all held together in optical contact. Lens component 336 is a single lens element made out of B270, a lens material available from Schott Glass Technologies, Inc. Lens component 336 has a first outside surface 38 and a second outside surface 340.

Lens component 342 has two lens elements 344 and 346. Lens element 344 is made out of SF5, a lens material available from Schott Glass Technologies, Inc. Lens element 346 is made out of BK7, a lens material available from Schott Glass Technologies, Inc. Lens component 342 has a first outside surface 348, an inside surface 350 and a second outside surface 352.

Lens component 354 has two lens elements 356 and 358. Lens element 356 is made out of BK7, a lens material available from Schott Glass Technologies, Inc. Lens element 358 is made out of F4, a lens material available from Schott Glass Technologies, Inc. Lens component 354 has a first outside surface 360, an inside surface 362 and a second outside surface 364.

Lens component 366 is a single lens element made out of 523586, a lens material available from Bausch and Lomb. Lens component 366 has a first outside surface 368 and a second outside surface 370.

The system 300 has a collimated input beam which illuminates a scanning mirror 332. Beams 334 exiting the mirror 332 are processed by lenses 336, 342, 354 and 366, and relayed by them to the hologram location 372. Together lenses 336, 342, 354 and 366 comprise a configuration known as a "4F scanner" (which is so called because, if two identical lens arrangements are used, the distance from the scanning mirror to the illuminated point is nominally four times F, the focal length of the lens arrangement).

The four lens elements can be divided into two groups of two lens elements. The first group of lens elements 374 contains lens elements 336 and 342. The second group of lens elements 376 contains lens elements 354 and 366.

The first lens group of lens elements 374 receives collimated light beams 334 at different angles, pivoting about a fixed point near the mirror 332. The first group of lens elements 374 converts light beams 334 into converging light, with the central rays of each converging beam being approximately parallel to the optical axis. The light beams 334 then travel a distance great enough that they go past a focal point and are now diverging, but still with the central rays still essentially parallel to the axis. The second lens group 376 then receives these light beams 334, converting them again into approximately collimated light. But now the central rays of light beams 334 (that is, each beam during the scan) are converging toward the center of the hologram location 372.

In the obliquity correction system 300, the mirror 332 and hologram (object and image) locations 372 are moved off the optical axis. This enables the astigmatism of the off-axis lenses 336, 342, 352 and 366 to change the beam width as a function of scan angle. The lens surface prescriptions are optimized to reduce aberrations that are not used to control obliquity, while allowing the beam width to change. The lenses are optimized using Zemax® an optical design program available from Focus Software Inc. The software program was directed to optimize the lens system with respect to three criteria: beam width, beam shift, and wavefront flatness. The characteristics of the lenses in obliquity correction system 300 are summarized in Table 1.

TABLE 1

| Surface # | Radius(mm) | Central Thickness/ Air Space(mm) t* | Glass |
|---|---|---|---|
| 338 | Infinity | 4.0 (y = 338, x = 340) | B270 |
| 340 | −19.8700 | 12.33 (y = 340, y = 348) | air |
| 348 | 93.5716 | 1.5 (y = 348, x = 350) | SF5 |
| 350 | 32.1937 | 5.0 (y = 350, x = 352) | BK7 |
| 352 | −43.5142 | 20.79 (y = 352, x = 360) | air |
| 360 | 55.3710 | 6.10 (y = 360, x = 362) | BK7 |
| 362 | −17.9600 | 3.2 (y = 362, x = 364) | F4 |
| 364 | −48.3092 | 4.0 (y = 364, x = 368) | air |

TABLE 1-continued

| Surface # | Radius(mm) | Central Thickness/ Air Space(mm) t* | Glass |
|---|---|---|---|
| 368 | 13.2850 | 10.4 (y = 368, x = 370) | 523586 |
| 370 | Infinity | 9.7 (y = 370, x = 372) | air |

*t = distance between positions y and x, wherein x and y are positions in FIG. 3.

The scanning mirror 332 is 20 mm from the first outside surface 338 of first component 336, and is 2.63 mm off axis. The top surface of the scanned media 378 is 9.7 mm from second outside surface 370 of lens component 366. The center of the volume being illuminated 372 is approximately 2.2 mm off axis.

Figure 4:
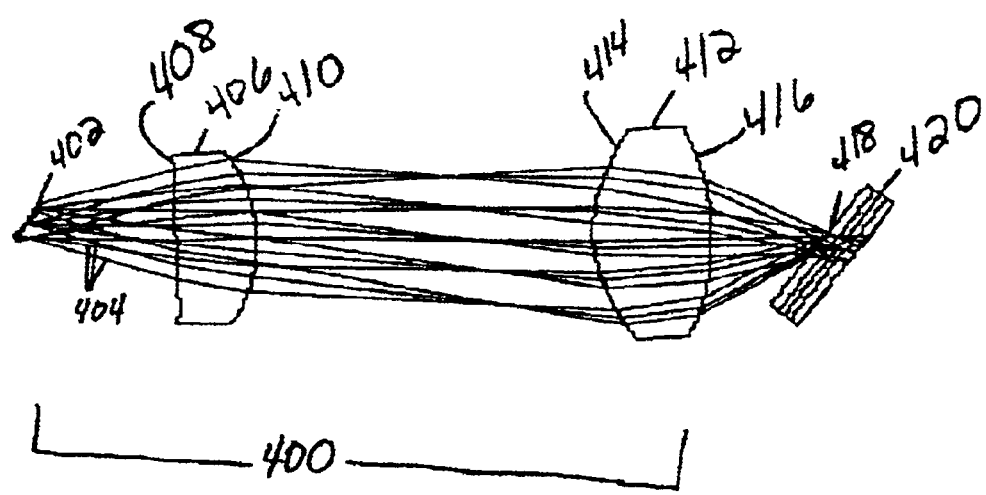
FIG. 4 is another embodiment of an obliquity correction system according to the present invention.

FIG. 4 shows an obliquity correction system 400 made up of two lens components 406 and 412. Both lens components 406 and 412 have single lens elements with aspherical surfaces. Lens component 406 is a single lens element made out of C0550, a lens material available from Corning Inc. Lens component 406 has a first outside surface 408 and a second outside surface 410. Lens component 412 is a single lens element made out of C0550. Lens component 412 has a first outside surface 414 and a second outside surface 416.

The system 400 has a collimated input beam which illuminates a scanning mirror 402. Beams 404 exiting the mirror 402 are processed by lenses 406 and 412, and relayed by them to the hologram location 418.

Lens component 406 receives collimated light beams 334 at different angles pivoting about a fixed point near the mirror 402. Lens component 406 converts light beams 404 into converging light, with the central rays of each converging beam being approximately parallel to the optical axis. The light beams 404 then travel a distance great enough that they go past a focal point and are now diverging, but still with the central rays still essentially parallel to the axis. Lens component 412 then receives these light beams 404, converting them again into approximately collimated light. But now the central rays of light beams 404 (that is, each beam during the scan) are converging toward the center of the hologram location 418.

In the obliquity correction system 400, the mirror 402 and hologram (object and image) locations 418 are moved off the optical axis. This enables the astigmatism of the off-axis lenses 406 and 412 to change the beam width as a function of scan angle. The lens surface prescriptions are optimized to reduce aberrations that are not used to control obliquity, while allowing the beam width to change. The lenses are optimized using Zemax®. The software program was directed to optimize the lens system with respect to three criteria: beam width, beam shift, and wavefront flatness. The characteristics of the lenses in obliquity correction system 400 are summarized in Table 2.

TABLE 2

| Surface # | Radius(mm) | Central Thickness/ Air Space(mm) t* | Glass |
|---|---|---|---|
| 408 | −4.856e−28** | 8.0 (y = 408, x = 410) | C0550 |
| 410 | −14.639** | 33.91 (y = 410, y = 414) | air |
| 414 | 13.265** | 12.0 (y = 414, x = 416) | C0550 |
| 416 | —23.395** | 11.52 (y = 416, x = 418) | air |

*t = distance between positions y and x, wherein x and y are positions in FIG. 4.
**The aspheric coefficients are:
Surface 408: k = −9.799e40  a4 = −6.35e−5  a6 = −3.539−7  a8 = −1.152e−8
Surface 410: k = 0.749  a4 = 0.000121  a6 = 2.187e−7  a8 = −4.790e−9
Surface 414: k = −0.213  a4 = −7.116e−5  a6 = −3.874e−7  a8 = 1.440e−9
Surface 416: k = −0.262  a4 = 9.926e−6  a6 = −5.145e−8  a8 = −8.74e−11

The scanning mirror 402 is 15 mm from the first outside surface 408 of first component 406. First component 406 is tilted 2.72 degrees and is and is 1.58 mm off axis. The top surface of the scanned media 420 is 11.52 mm from second outside surface 416 of lens component 412. Second component 412 is tilted 2.21 degrees and is approximately 0.458 off axis.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire invention of the patents and publications referred in this application are hereby incorporated herein by reference.

What is claimed is:

1. A method of obliquity correction comprising:
projecting a light beam through one or more off-center lens components onto a surface with an angle of incidence, wherein the off-center lens components vary the width of the light beam at the surface as the angle of incidence on the surface changes and the off-center lens components produce a wavefront error of less than 20 waves.

2. The method of claim 1, wherein the lens components narrow the width of the light beam as the angle of incidence increases.

3. The method of claim 1, wherein the projected light beam is a planar beam.

4. The method of claim 1, wherein the incident light beam is a collimated beam.

5. The method of claim 1, wherein the off-center lens components image the light beam anamorphically.

6. The method of claim 1, wherein the surface comprises a holographic storage medium.

7. The method of claim 6, wherein the holographic storage medium comprises a polymer matrix.

8. A holographic recording system comprising:
a reference beam source;
a lens system; and
a holographic storage medium, wherein the reference beam source projects a reference beam that is incident upon the holographic storage medium, the lens system varies the width of the reference beam as the angle of incidence upon the holographic storage medium changes and the reference beam that is incident upon the holographic storage medium has a wavefront error of less than 20 waves.

9. The holographic storage system of claim 8, wherein the incident reference beam is collimated.

10. The holographic storage system of claim 8, wherein the reference beam source projects a planar reference beam.

11. The holographic storage system of claim 8, wherein the incident reference beam is projected onto a planar surface of the holographic storage medium.

12. The holographic storage system of claim 8, wherein the holographic storage medium comprises a polymer matrix.

13. The holographic storage system of claim 8, wherein the reference beam source comprises a scanning mirror.

14. The holographic storage system of claim 8, wherein the reference beam intersects a data beam within the holographic storage medium to produce an interference pattern.

15. The holographic storage system of claim 8, wherein an interference pattern is recorded within the holographic storage medium.

16. The holographic storage system of claim 8, wherein the reference beam that is incident upon the holographic storage medium with an angular range of at least 20 degrees to 50 degrees.

17. A holographic retrieval system comprising:
a reference beam source;
a lens system; and
a holographic storage medium, wherein the reference beam source projects a reference beam that is incident upon the holographic storage medium, the lens system varies the width of the reference beam as the angle of incidence upon the holographic storage medium changes and the reference beam that is incident upon the holographic storage medium has a wavefront error of less than 20 waves.

18. The holographic retrieval system of claim 17, wherein the incident reference beam is collimated.

19. The holographic retrieval system of claim 17, wherein the reference beam source projects a planar reference beam.

20. The holographic retrieval system of claim 17, wherein the incident reference beam is projected onto a planar surface of the holographic storage medium.

21. The holographic retrieval system of claim 17, wherein the holographic storage medium comprises a polymer matrix.

22. The holographic retrieval system of claim 17, wherein the reference beam source comprises a scanning mirror.

23. The holographic retrieval system of claim 17, wherein the reference beam intersects a holographic image within the holographic storage medium to produce a data beam.

24. The holographic storage system of claim 17, wherein the interference pattern is recorded within the holographic storage medium.

25. The holographic storage system of claim 17, wherein the reference beam that is incident upon the holographic storage medium with an angular range of at least 20 degrees to 50 degrees.

* * * * *